(12) United States Patent
Jones et al.

(10) Patent No.: US 7,369,601 B2
(45) Date of Patent: May 6, 2008

(54) CODE DIVISION MULTIPLE ACCESS RECEIVER

(75) Inventors: Alan Edward Jones, Derry Hill (GB); David Trewren, Bristol (GB)

(73) Assignee: IPWireless, Inc., San Bruno, CA (US)

( * ) Notice: Subject to any disclaimer, the term of this patent is extended or adjusted under 35 U.S.C. 154(b) by 814 days.

(21) Appl. No.: 10/279,698

(22) Filed: Oct. 24, 2002

(65) Prior Publication Data

US 2003/0099226 A1 May 29, 2003

(30) Foreign Application Priority Data

Oct. 24, 2001 (GB) .................................. 0125484.6

(51) Int. Cl.
*H04B 1/69* (2006.01)
(52) U.S. Cl. ...................... 375/147; 375/148; 375/130; 375/316; 375/150; 370/342; 370/335; 370/320; 455/67.11
(58) Field of Classification Search ................ 375/148, 375/316, 130, 147, 150; 370/342, 335; 455/67.11
See application file for complete search history.

(56) References Cited

U.S. PATENT DOCUMENTS

| | | | | |
|---|---|---|---|---|
| 6,748,025 | B1 * | 6/2004 | Hickling | 375/316 |
| 6,901,105 | B1 * | 5/2005 | Razzell | 375/148 |
| 2002/0006156 | A1 * | 1/2002 | Belaiche | 375/130 |
| 2002/0061005 | A1 * | 5/2002 | Lee et al. | 370/342 |

FOREIGN PATENT DOCUMENTS

| | | |
|---|---|---|
| EP | 1021010 A2 | 7/2000 |
| EP | 1117184 | 7/2001 |
| GB | 2362075 A | 11/2001 |
| WO | WO-01/43330 A2 | 6/2001 |
| WO | WO-01/50615 A2 | 7/2001 |

(Continued)

OTHER PUBLICATIONS

Hasanudin, H, et al. (1999). "Reducing Switch Delay by Reconstruction of Tree Structured Orthogonal Codes in CDMA Mobile Switching System," Workshop Notes- IEEE International Workshop on Intelligent Signal Processing and Communication System, 585-588.

(Continued)

*Primary Examiner*—Chieh M. Fan
*Assistant Examiner*—Eva Zheng
(74) *Attorney, Agent, or Firm*—Morrison & Foerster LLP

(57) ABSTRACT

Processing of a received code division multiple access, CDMA, burst (405) when a spreading factor of the CDMA burst (405) has been changed from an allocated spreading factor ($SF_0$) to a new spreading factor ($SF_n$). The received burst (405) is processed with a CDMA detector (310), using the allocated spreading factor ($SF_0$), to provide a CDMA detector output; the new spreading factor ($SF_n$) of the burst is determined; and the CDMA detector output is decimated by a factor determined from the new spreading factor ($SF_n$). The decimator may be a FIR decimator (315) and tap weights may be determined using the values of the new spreading factor ($SF_n$) and the allocated spreading factor ($SF_0$). Application in a Node B (150A) of a UMTS system (100), particularly in UTRA TDD mode, for processing received uplink communication is described.

22 Claims, 6 Drawing Sheets

FOREIGN PATENT DOCUMENTS

WO    WO-0176103    10/2001

OTHER PUBLICATIONS

International Search Report mailed Jan. 1, 2003, for WO Application No. PCT/GB02/04791 filed Oct. 23, 2002, 3 pages.

"3rd Generation Partnership Project; Technical Specification Group Radio Access Network; Physical Channels and Mapping of Transport Channels onto Physical Channels (TDD) (Release 1999)," (Sep. 2002). 3GPP:Valbonne, France TS 25.221 v3.11.0:1-51.

Great Britain Search Report mailed Jun. 26, 2002, for Great Britain Application No. 0125484.6 filed Oct. 24, 2001, 1 page.

European Examination Report mailed Feb. 1, 2007, for European Application No. 02801963.6 filed Oct. 23, 2002, 5 pages.

* cited by examiner

505

| $C_1^{(1)} = [1]$ | $C_2^{(1)} = [11]$ | $C_4^{(1)} = [1111]$ | $C_8^{(1)} = [11111111]$ | $C_{16}^{(1)} = [1111111111111111]$ |
| | | | | $C_{16}^{(2)} = [1111111100000000]$ |
| | | | $C_8^{(2)} = [11110000]$ | $C_{16}^{(3)} = [1111000011110000]$ |
| | | | | $C_{16}^{(4)} = [1111000000001111]$ |
| | | $C_4^{(2)} = [1100]$ | $C_8^{(3)} = [11001100]$ | $C_{16}^{(5)} = [1100110011001100]$ |
| | | | | $C_{16}^{(6)} = [1100110000110011]$ |
| | | | $C_8^{(4)} = [11000011]$ | $C_{16}^{(7)} = [1100001111000011]$ |
| | | | | $C_{16}^{(8)} = [1100001100111100]$ |
| | $C_2^{(2)} = [10]$ | $C_4^{(3)} = [1010]$ | $C_8^{(5)} = [10101010]$ | $C_{16}^{(9)} = [1010101010101010]$ |
| | | | | $C_{16}^{(10)} = [1010101001010101]$ |
| | | | $C_8^{(6)} = [10100101]$ | $C_{16}^{(11)} = [1010010110100101]$ |
| | | | | $C_{16}^{(12)} = [1010010101011010]$ |
| | | $C_4^{(4)} = [1001]$ | $C_8^{(7)} = [10011001]$ | $C_{16}^{(13)} = [1001100110011001]$ |
| | | | | $C_{16}^{(14)} = [1001100101100110]$ |
| | | | $C_8^{(8)} = [10010110]$ | $C_{16}^{(15)} = [1001011010010110]$ |
| | | | | $C_{16}^{(16)} = [1001011001101001]$ |

FIG. 2

CODE DIVISION MULTIPLE ACCESS RECEIVER

FIELD OF THE INVENTION

This invention relates to Code Division Multiple Access (CDMA) detectors, and CDMA receivers comprising CDMA detectors. This invention is particularly applicable to CDMA receivers and detectors for use in Universal Mobile Telephone System (UMTS) systems, especially in UMTS Terrestrial Radio Access (UTRA) Time Division Duplex (TDD) mode.

BACKGROUND OF THE INVENTION

In the field of this invention it is known that in CDMA systems, such as UMTS, particularly UTRA TDD mode, the data part of a burst is spread with a channelisation code that can have different spreading factors, i.e., different numbers of elements in the code. In UTRA TDD, the spreading factors that may be used for uplink physical channels are 1, 2, 4, 8 and 16.

For each physical channel an individual minimum spreading factor $SF_{min}$ is transmitted by means of the higher layers to the user equipment (UE), e.g. a mobile telephone, i.e. the UE is allocated a spreading factor. The UE determines or is currently using a transport format combination (TFC), comprising for example the type of forward error correction, the power etc. for its uplink transmission. In UTRA TDD, for example, the UE then has two options with respect to the spreading factor it has been allocated:
1. The UE uses the spreading factor $SF_{min}$, independent of the current TFC.
2. The UE autonomously increases the spreading factor depending on the current TFC (e.g. if the UE decides it does not have sufficient power to use a spreading factor as low as the allocated spreading factor, it may increase the spreading factor, i.e. use a new spreading factor in its uplink transmission). This invention relates to this second option.

In UTRA TDD mode the UE includes in its uplink burst an item known as a Transport Format Combination Indicator (TFCI) which informs the receiving communication unit, e.g. a Node B, of the TFC being used i.e. the TFCI data bits are used to inform the receiving end which transport channels are active for the current Radio Frame; this information also allows the receiving end to determine the spreading factor allocated/employed. An uplink burst (405) in UTRA TDD mode is as shown in FIG. 1, and as known from the technical specification '3GPP TS25.221' (available from the website www.3gpp.org) of the 3$^{rd}$ Generation Partnership Project, where the TFCI bits (410A, 410B) are inserted either side of the midamble (415), (Note TPC (Transmit Power Control) bits (420) are also included as are data symbols (425A, 425B)). In the uplink of UTRA TDD mode, the TFCI bits are usually encoded producing a TFCI codeword, the TFCI codeword and TPC bits are always spread at spreading factor 16 irrespective of the spreading in the data portions of the burst.

When the UE autonomously changes the spreading factor, it is only allowed to do so in certain ways effectively governed by rules, which in UTRA TDD specify that the spreading factor may only be increased by moving the channelisation code along the lower branch of the allowed orthogonal variable spreading factor (OVSF) sub tree.

The OVSF tree (505) is shown in FIG. 2, where $C_{SF}^{k}$ is the channelisation code, k is the code number, and SF is the spreading factor. Let $k_o$ and $SF_o$ be the original code number and spreading factor respectively, such that the associated channelisation code is given by $C_o^o$. If the UE selects a new spreading factor, $SF_n$, then the position of the new channelisation code in the OVSF sub tree is given by $$k_n = \frac{SF_n}{SF_o} \times k_o$$

Suppose a UE is allocated the following channelisation code $C_4^3$, but decides to change autonomously the spreading factor to $SF_n=16$. According to the above equation, the position of the new channelisation code is given by $$k_n = \frac{16}{4} \times 3$$

where the new channelisation code is defined by $C_{16}^{12}$. By inspection of the OVSF tree shown in FIG. 2, we see that $C_{16}^{12}$ belongs to the lower branch of the $C_4^3$ sub tree.

Considering the uplink burst in UTRA TDD mode, on the receive side, the Node B is unaware of the fact that the UE has changed spreading factor. However, there is a unique association between TFCI and spreading factor. Since the TFCI bits are always spread using the channelisation code in the lowest branch of the OVSF sub tree, the receiving end knows a priori the TFCI channelisation code. Therefore, by first detecting and then decoding the TFCI codeword, the receiving end can determine $SF_n$. Once $SF_n$ is known, it can calculate the position of the new channelisation code $C_n^n$ from the original channelisation code $C_0^0$ using the equation $$k_n = \frac{SF_n}{SF_o} \times k_o$$

Thereafter, the burst will need to be processed in a manner taking account of the new spreading factor.

A need therefore arises for a CDMA receiver adapted to accommodate the possibility of the spreading factor having been changed by the UE.

STATEMENT OF INVENTION

The present invention arises from the inventors' realization that if a CDMA detector of a CDMA receiver were, after processing the received burst using the allocated spreading factor, to then be reconfigured to process the data using the new spreading factor, this would be an inefficient procedure. For example, the inventors have considered the following four-step approach:
  Step 1 construct the CDMA detector using $SF_o$ and process the burst in the region of the TFCI codeword.
  Step 2 decode the TFCI codeword and through the use of TFCI bits determine $SF_n$ in the usual manner.
  Step 3 if $SF_o \neq SF_n$ reconfigure the CDMA detector; if $SF_o = SF_n$ keep CDMA detector with original configuration.
  Step 4 process the complete received burst.

The present inventors have realised that were this approach to be used, it may well be very costly, not only in terms of processing but also latency, since at Step 3 the receiver is effectively set up twice to detect a single burst.

In accordance with a first aspect of the present invention, there is provided a method of processing a received code division multiple access, CDMA, burst when a spreading factor of the CDMA burst has been changed from an allocated spreading factor to a new spreading factor;

the method comprising the steps of:

processing the received CDMA burst with a CDMA detector, wherein the CDMA detector uses the allocated spreading factor, to provide a CDMA detector output;

determining the new spreading factor of the burst; and decimating the CDMA detector output by a decimating factor determined from the determined new spreading factor.

In accordance with a second aspect of the present invention, there is provided a storage medium storing processor-implementable instructions for controlling one or more processors to carry but the method of the first aspect.

In accordance with a third aspect of the present invention, there is provided a CDMA receiver for processing a received code division multiple access, CDMA, burst when a spreading factor of the CDMA burst has been changed from an allocated spreading factor to a new spreading factor;

the CDMA receiver comprising:

a CDMA detector arranged to process the received CDMA burst, using the allocated spreading factor, to provide a CDMA detector output;

means for determining the new spreading factor of the burst; and a decimator for decimating the CDMA detector output by a decimating factor determined from the determined new spreading factor.

In accordance with a fourth aspect of the present invention, there is provided a processor comprising the CDMA receiver of the third aspect.

In accordance with a fifth aspect of the present invention, the CDMA receiver of the third aspect is comprised in a communication unit.

In accordance with a sixth aspect of the present invention, the CDMA receiver of the third aspect is comprised in a communication system.

The present invention uses the original configuration of the CDMA detector and exploits the natural repetition inherent in the signal from a change in spreading factor. By adopting this approach the problems associated with Step 3 in the possible solution contemplated above are reduced or avoided.

BRIEF DESCRIPTION OF THE DRAWINGS

Embodiments of the present invention will now be described, by way of example only, with reference to the accompanying drawings, in which:

FIG. 2 shows an OVSF tree;

DESCRIPTION OF PREFERRED EMBODIMENT

In the preferred embodiment, the invention is applied to a UMTS network (or system) employing, inter-alia, UTRA TDD mode, but it is to be appreciated the invention may be applied to any system involving variation of spreading code.

Figure 1:
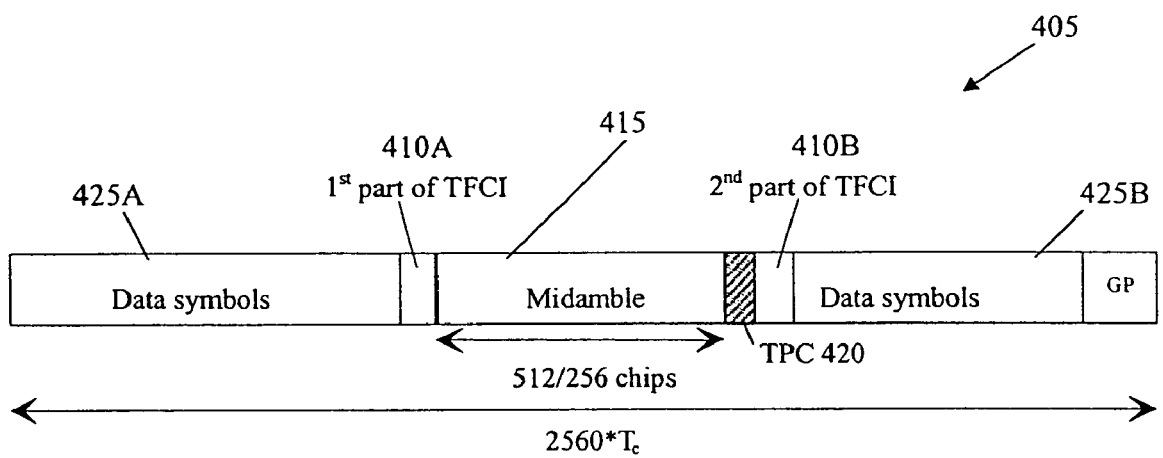
FIG. 1 shows a timing diagram illustrating an uplink burst in UTRA TDD mode.
Figure 3:
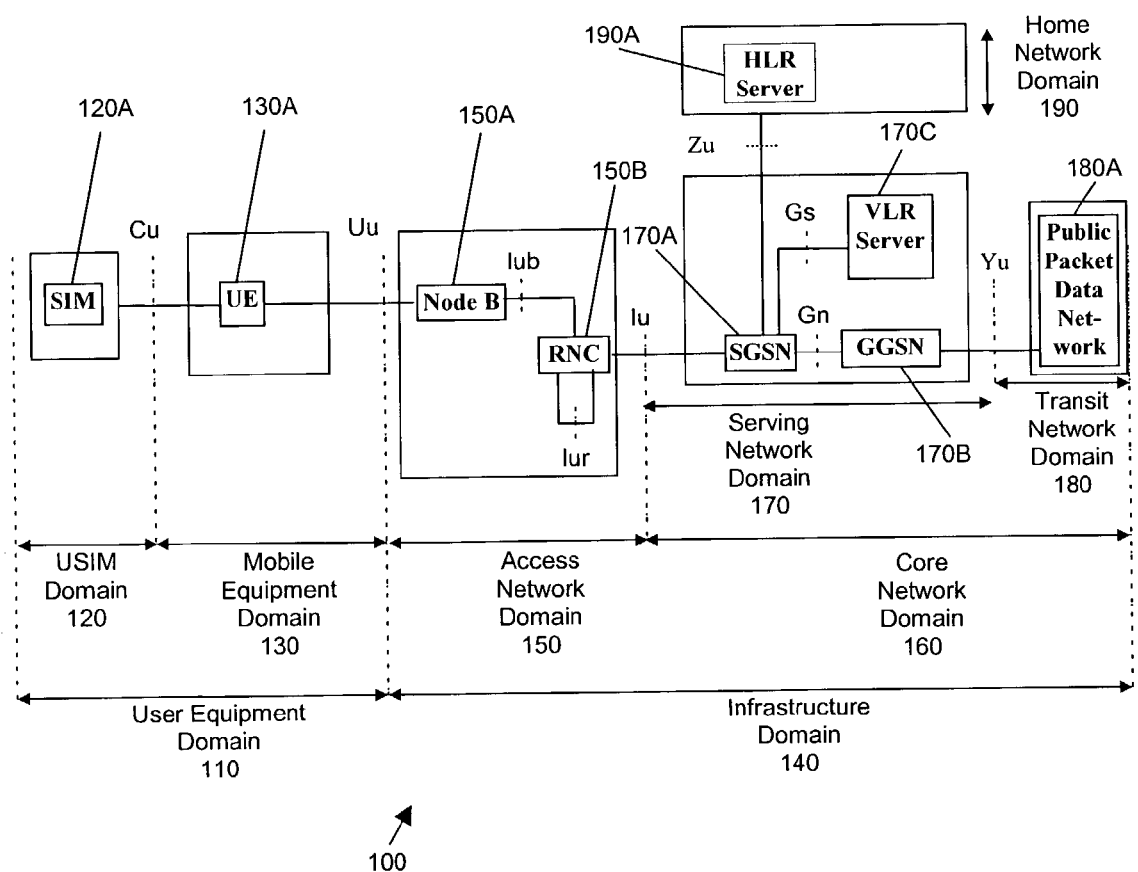
FIG. 3 is a block diagram of a UMTS network.

FIG. 3 shows a typical UMTS network (100), which may conveniently be considered as comprising: a user equipment domain (110), made up of a user SIM (USIM) domain (120) and a mobile equipment domain (130); and an infrastructure domain (140), made up of an access network domain (150), and a core network domain (160), which is in turn made up of a serving network domain (170) and a transit network domain (180) and a home network domain (190).

In the mobile-equipment domain (130), user equipment UE (130A), e.g. a mobile telephone, receives data from a user SIM (120A) in the USIM domain 120 via the wired Cu interface. The UE (130A) communicates data with a Node B (150A) in the network access domain (150) via the wireless Uu interface. The Node B (150A) is effectively a base station, i.e. a type of communication unit. Within the network access domain (150), the Node B (150A) communicates with an RNC (150B) via the Iub interface. The RNC (150B) communicates with other RNCs (not shown) via the Iur interface. The RNC (150B) communicates with a SGSN (170A) in the serving network domain (170) via the Iu interface. Within the serving network domain (170), the SGSN (170A) communicates with a GGSN (170B) via the Gn interface, and the SGSN (170A) communicates with a VLR server (170C) via the Gs interface. The SGSN (170A) communicates with an HLR server (190A) in the home network domain (190) via the Zu interface. The GGSN (170B) communicates with public data network (180A) in the transit network domain (180) via the Yu interface.

Thus, the elements RNC (150B), SGSN (170A) and GGSN (170B) are conventionally provided as discrete and separate units (on their own respective software/hardware platforms) divided across the access network domain (150) and the serving network domain (170), as shown in FIG. 3.

The RNC (150B) is the UTRAN element responsible for the control and allocation of resources for numerous Node B's (150A); typically 50 to 100 Node B's may be controlled by one RNC. The RNC also provides reliable delivery of user traffic over the air interfaces. RNCs communicate with each other (via the interface Iur) to support handover and macro-diversity.

The SGSN (170A) is the UMTS Core Network element responsible for Session Control and interface to the Location Registers (HLR and VLR). The SGSN is a large centralised controller for many RNCs.

The GGSN (170B) is the UMTS Core Network element responsible for concentrating and tunnelling user data within the core packet network to the ultimate destination (e.g., internet service provider—ISP).

In this embodiment, the Node B (150A) has been adapted, to offer, and provide for, accommodation of the possibility of the spreading factor having been changed by the UE (130A) in a received uplink transmission, as will be described in more detail below.

The adaptation may be implemented in the Node B (150A) in any suitable manner. For example, new apparatus may be added to a conventional Node B design, or alternatively existing parts of a conventional Node B design may be adapted, for example by reprogramming of one or more processors therein. As such the required adaptation may be implemented in the form of processor-implementable instructions stored on a storage medium, such as a floppy disk, hard disk, PROM, RAM or any combination of these or other storage media.

It is also within the contemplation of the invention that such adaptation may alternatively be controlled, implemented in full or implemented in part by adapting any other suitable part of the UMTS network 100. Further, in the case of other network infrastructures, implementation may be at any appropriate node or entity, such as any other appropriate type of base station, base station controller etc. Alternatively the various steps involved in the process of accommodating changed spreading factor in a received signal (as will be described in more detail below) can be carried out by various components distributed at different locations or entities within any suitable network or system.

Figure 4:
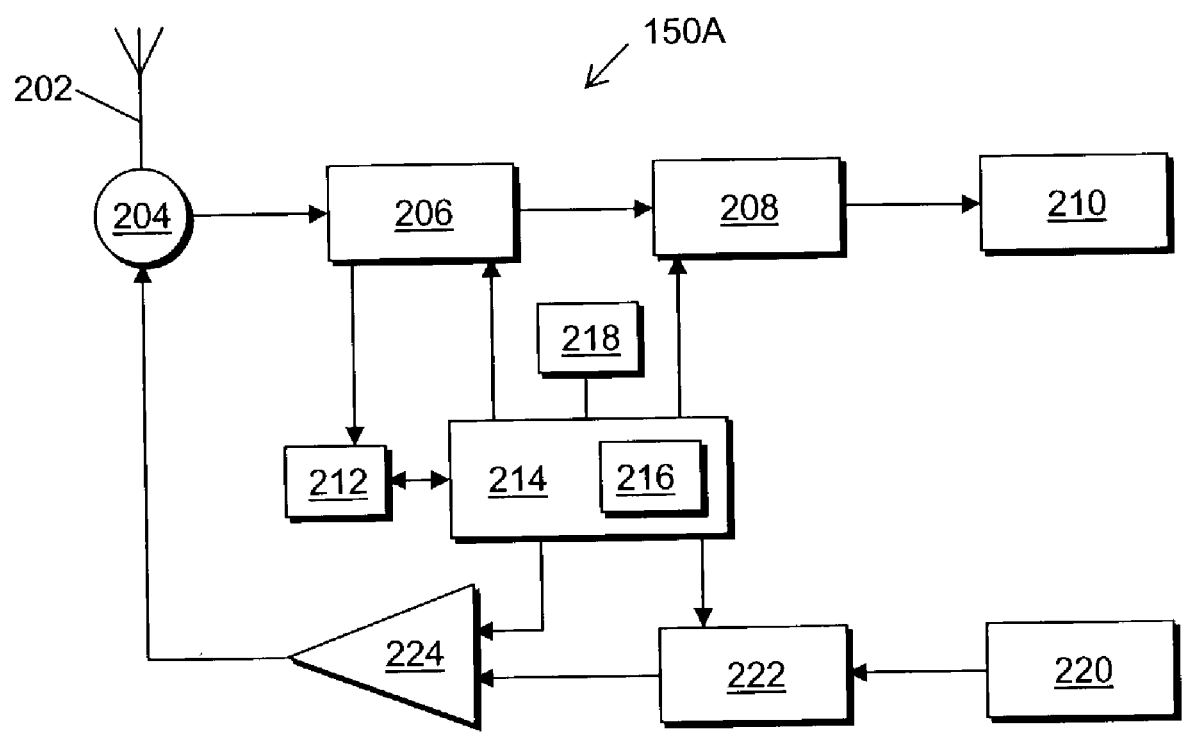
FIG. 4 is a block diagram of a Node B.

The Node B (150A) constitutes a communications unit whose functional modules may be represented as illustrated in block diagram form in FIG. 4. As the Node B (150A) is a base station, it comprises many receiver chains and transmission chains. For clarity, only one of each is shown in FIG. 4 and described below.

The Node B (150A) contains an antenna (202) coupled to a duplex filter or circulator (204) that provides isolation between receive and transmit chains within the Node B (150A).

The receiver chain, as known in the art, includes scanning receiver front-end circuitry (206) (effectively providing reception, filtering and intermediate or base-band frequency conversion). The scanning front-end circuit is serially coupled to a signal processing function (208).

An output from the signal processing function is provided to output (210), which comprises interface means for communicating with RNC (150B).

The receiver chain also includes received signal strength indicator (RSSI) circuitry (212), which in turn is coupled to a controller (214) that operates to maintain overall control of the different functions and modules of the Node B (150A). The controller (214) is also coupled to the scanning receiver front-end circuitry (206) and the signal processing function (208) (generally realised by a digital signal processor, i.e. DSP).

The controller (214) includes a memory (216) that stores operating regimes, including those of interest with respect to this invention such as decoding and other receiving operations. A timer (218) is typically coupled to the controller (214) to control the timing of operations (transmission or reception of time-dependent signals) within the Node B (150A).

As regards the transmit chain, this includes an input (220), which comprises interface means for receiving communication from RNC (150B). The input (220) is coupled in series through transmitter/modulation circuitry (222) and a power amplifier (224) to the antenna (202). The transmitter/modulation circuitry (222) and the power amplifier (224) are operationally responsive to the controller.

The various components within the Node B (150) are realised in this embodiment in integrated component form. Of course, in other embodiments, they may be realised in discrete form, or a mixture of integrated components and discrete components, or indeed any other suitable form. Further, in this embodiment the controller (214) including memory (216) is implemented as a programmable processor, but in other embodiments can comprise dedicated circuitry or any other suitable form.

It is noted that corresponding features to those described above with respect to the Node B (150A) are also found in conventional Node B's. However, the Node B (150A) of this embodiment differs over conventional Node B's and other similar modules by virtue that the controller (214), including memory (216), and where appropriate, the signal processing function (208) and the scanning receiver front-end circuitry (206) is adapted with respect to reception and detection of uplink signals as will be described in more detail below.

In particular, the receiver module or function, hereinafter referred to as CDMA receiver (305), of the Node B (150A) is as represented in block diagram form in FIG. 5. The CDMA receiver (305) comprises a CDMA detector (310) arranged to receive the incoming uplink transmissions, and to receive as a further data input the original value $SF_0$ of the spreading factor. The CDMA detector (310) is arranged to provide outputs to a decimator, in this embodiment a finite impulse response (FIR) decimator (315), and a transport format combination indicator (TFCI) decoder (320). The TFCI decoder is arranged to provide an output to a tap weight determining module (325). The tap weight determining module (325) is further arranged to provide an output to the FIR decimator (315). These modules are set up and operated to implement the following way of processing the received signal.

When the UE (130A) increases its spreading factor above the allocated value, the number of bits transmitted will naturally decrease (Note, a UE can never decrease its spreading factor above the original allocation, $C_0^0$, as the sub tree of the next channelisation code may be assigned to another user). If the CDMA detector (305) at the Node B (150A) performs detection at the original spreading factor $SF_0$, then the number of data samples at the output of the CDMA detector increases by the factor $$s = \frac{SF_n}{SF_0}$$

where $s \in (1,2,4,8,16)$. In order to reconstruct the original data samples, a process comprising decimating the output of the detector by a factor of s times is employed.

Figure 5:
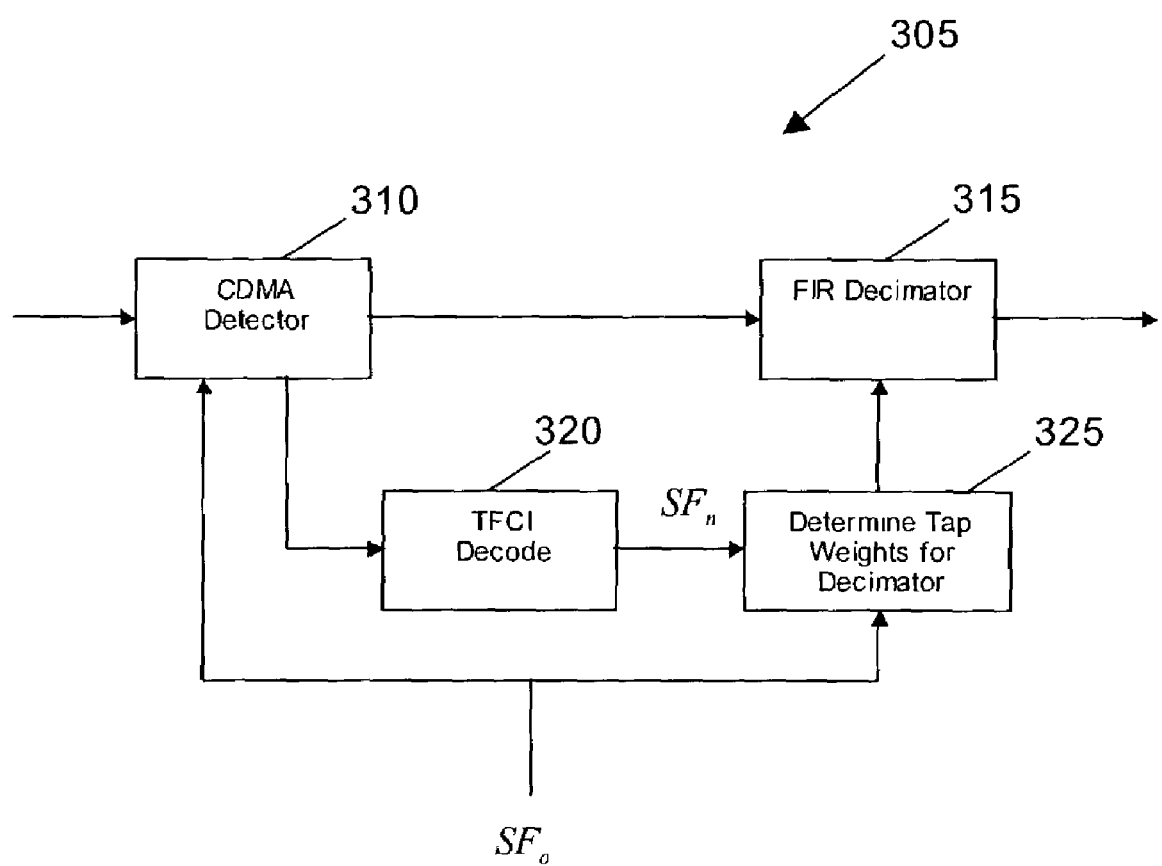
FIG. 5 shows a block schematic diagram of a receiver incorporating a CDMA detector utilising the present invention.

Referring to FIG. 5, the received signal is processed by the CDMA detector (310) using $SF_0$, the output of the CDMA detector is subsequently applied to the TFCI decoder (320), where the new spreading factor, $SF_n$, is determined. This value for $SF_n$ is used by the tap weight determining module (325) to determine the tap weights for the FIR decimator (315).

Note that the channelisation codes in the lower branches of the OVSF tree are constructed in a particular manner, for example $$C_2^{(2)} = C_1^{(1)} \| \overline{C}_1^{(1)}$$

$$C_4^{(4)} = C_2^{(2)} \| \overline{C}_2^{(2)}$$

$$C_8^{(8)} = C_4^{(4)} \| \overline{C}_4^{(4)}$$

$$C_{16}^{(16)} = C_8^{(8)} \| \overline{C}_8^{(8)}$$

where $\|$ denotes vector concatenation, and overbar is a logical inversion. Based on this construction, and noting that the output of the CDMA detector is complex, the tap weights of the FIR decimator, $w_p = (w_{p,1}, w_{p,2}, \ldots w_{p,s})$, are given by $$w_0 = +1; p=0$$

$$w_p = w_{p-1} \| (-1) \times w_{p-1}; p>0$$

where $p = \log_2(s)$, and the length of the FIR decimator is a function of s. Let $d = (d_1, d_2, \ldots, d_N)$ be the output of the CDMA detector and define N as the number of samples, we then write the output of the FIR decimator as $$e_u = \sum_{i=1}^{s} w_{p,i} d_{i+s(u-1)}; u = 1, \ldots N/s$$

Figure 6:
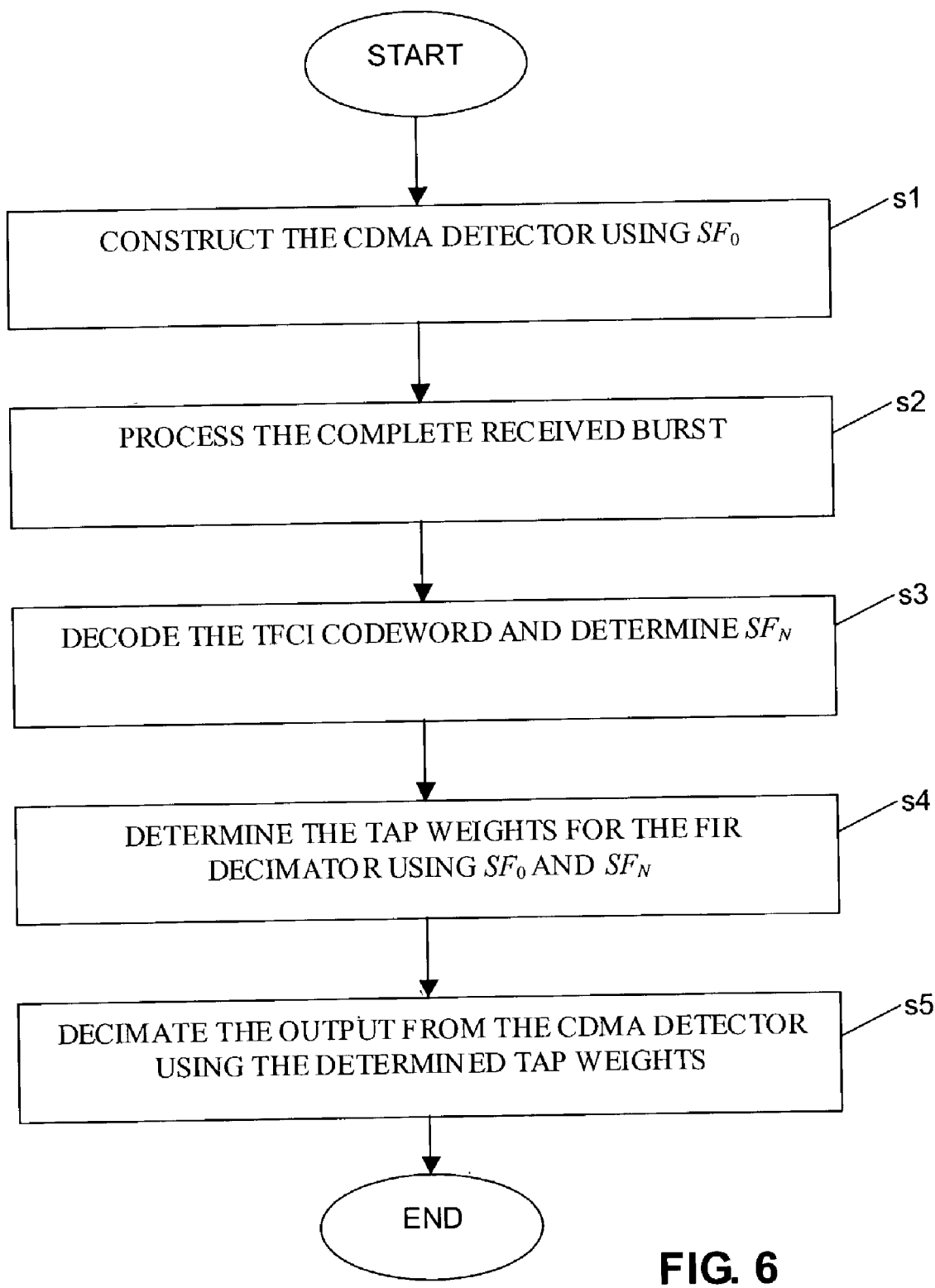
FIG. 6 is a flowchart showing process steps carried out in an embodiment of the invention.

The process steps carried out by the controller (214) will now be described with reference to the process flowchart of FIG. 6.

At step s1, the controller (214) constructs the CDMA detector (310) using $SF_0$. At step s2, the CDMA detector (310) processes the complete received burst. At step s3, the TFCI decoder (320) decodes the TFCI codeword and through the use of TFCI bits determines $SF_n$ in the usual manner. At step s4, the tap weight determining module (325) determines the tap weights for the FIR decimator (315) using $SF_0$ and $SF_n$. At step s5, the output from the CDMA detector (310) is decimated by the FIR decimator (315) using the determined tap weights.

In the above embodiment the decimating factor of the decimator is equal to the new spreading factor divided by the original allocated spreading factor. Also, in the above embodiment the decimator (315) is a FIR decimator, and the tap weights for the FIR decimator are determined using the newly acquired $SF_n$ value. Moreover, by making use of the characteristic that the samples are related through the channelisation codes in the OVSF tree, the data samples have a tendency to be combined optimally, thereby improving the signal-to-noise ratio of the receiver. Thus a finely tuned decimator introducing only low or minimal degradation may be provided, i.e. signal-to-noise ratio may be substantially maintained.

However, in other embodiments the decimating factor of the decimator may be some other value, other types of decimator may be employed, and they need not necessarily use the value of $SF_n$ for the purpose of determining tap weights or analogous aspects. Depending on the system under consideration, even were some loss in signal-to-noise-ratio to be introduced, the savings in processing power may render this worthwhile.

The present invention finds particular application in wireless communication systems such as UMTS systems. However, the inventive concepts contained herein are equally applicable to alternative wireless communications systems. Whilst the specific, and preferred, implementations of the present invention are described above, it is clear that variations and modifications of such inventive concepts could be readily applied by one skilled in the art.

The invention claimed is:

1. A method of processing a received code division multiple access (CDMA) burst in response to a change of a spreading factor of the CDMA burst from an allocated spreading factor to a new spreading factor, the method comprising:
    processing the received CDMA burst with a CDMA detector, wherein the CDMA detector uses the allocated spreading factor to provide a CDMA detector output;
    determining the new spreading factor of the burst based on samples of the CDMA detector output; and
    decimating the CDMA detector output by a decimating factor, which is based on the determined new spreading factor and the allocated spreading factor.

2. A method according to claim 1, wherein the decimating factor is equal to the new spreading factor divided by the allocated spreading factor.

3. A method according to claim 1, wherein the new spreading factor is determined from a transport format combination indicator contained in the CDMA burst.

4. A method according to claim 1, wherein the decimating step is performed using a finite impulse response decimator.

5. A method according to claim 4, further comprising:
    determining tap weights for the finite impulse response decimator using the values of the new spreading factor and the allocated spreading factor.

6. A method according to claim 5, wherein the step of determining tap weights for the finite impulse response decimator using the values of the new spreading factor and the allocated spreading factor uses rules specifying how the spreading factor of the CDMA burst was allowed to be changed from the allocated spreading factor to the new spreading factor.

7. A method according to claim 1, implemented in a universal mobile telecommunications system (UMTS) Terrestrial Radio Access Time Division Duplex, UTRA TDD, mode.

8. A method according to claim 6, wherein the method is implemented in a universal mobile telecommunications system (UMTS) Terrestrial Radio Access Time Division Duplex, UTRA TDD, mode, and wherein the rules specifying how the spreading factor of the CDMA burst was allowed to be changed from the allocated spreading factor to the new spreading factor comprise an orthogonal variable spreading factor tree.

9. A computer readable storage medium comprising instructions for controlling one or more processors, the instructions for causing the performance of the method of claim 1.

10. A code division multiple access (CDMA) receiver for processing a received CDMA burst in response to a change of a spreading factor of the CDMA burst from an allocated spreading factor to a new spreading factor, the CDMA receiver comprising:
    a CDMA detector to receive the CDMA burst using the allocated spreading factor to provide a CDMA detector output;
    control logic for determining the new spreading factor of the burst based on samples of the CDMA detector output; and
    a decimator for decimating the CDMA detector output by a decimating factor, which is based on the determined new spreading factor and the allocated spreading factor.

11. A CDMA receiver according to claim 10, wherein the decimating factor is equal to the new spreading factor divided by the allocated spreading factor.

12. A CDMA receiver according to claim 10, wherein the new spreading factor is determined from a transport format combination indicator contained in the CDMA burst.

13. A CDMA receiver according to claim 10, wherein the decimator comprises a finite impulse response decimator.

14. A CDMA receiver according to claim 13, further comprising means for determining tap weights for the finite impulse response decimator using the values of the new spreading factor and the allocated spreading factor.

15. A CDMA receiver according to claim 14, wherein the means for determining tap weights for the finite impulse response decimator is operable to use rules specifying how the spreading factor of the CDMA burst was allowed to be changed from the allocated spreading factor to the new spreading factor.

16. A CDMA receiver according to claim 10, adapted for use in a UMTS Terrestrial Radio Access Time Division Duplex (UTRA TDD) mode.

17. A CDMA receiver according to claim 16 wherein the decimator comprises a finite impulse response decimator, further comprising means for determining tap weights for the finite impulse response decimator using the values of the new spreading factor and the allocated spreading factor, wherein the means for determining tap weights for the finite impulse response decimator is operable to use rules specifying how the spreading factor of the CDMA burst was allowed to be changed from the allocated spreading factor to the new spreading factor, and wherein the rules specifying how the spreading factor of the CDMA burst was allowed to be changed from the allocated spreading factor to the new spreading factor comprise an orthogonal variable spreading factor tree.

18. A processor comprising a CDMA receiver according to claim 10.

19. A communication unit comprising a CDMA receiver according to claim 10.

20. A communication unit according to claim 19, in the form of an entity for use in a UMTS system.

21. A communication unit according to claim 20 in the form of a Node B.

22. A communication system comprising a CDMA receiver according to claim 10.

* * * * *